3,177,267
RETARDING CRACKING OF RUBBER DUE TO OZONE WITH A BORON ACID OR BORATE ESTER
John P. Luvisi, Park Ridge, Ill., assignor to Universal Oil Products Company, Des Plaines, Ill., a corporation of Delaware
No Drawing. Filed Aug. 31, 1959, Ser. No. 836,945
9 Claims. (Cl. 260—799)

This invention relates to a novel method of retarding the cracking of rubber due to ozone.

It now has been definitely established that deterioration of rubber in storage, transportation or during use is caused by ozone and by oxygen, and that the deterioration caused by ozone is different from the deterioration caused by oxygen. Cracking due to ozone is a surface reaction and the reaction products are ozonides. On the other hand, oxidative deterioration is not limited to only the surface but occurs throughout the rubber and the reaction products are hydroperoxides. It appears that the presence of ozone in the atmosphere is increasing and deterioration of rubber due to ozone is becoming more and more of a serious problem.

Another advantage of the present invention is that the antiozonant will not discolor rubber. Accordingly, it may be used in white or light colored rubber without objectionable discoloration. Most of the light colored rubber now being manufactured commercially is prepared from natural rubber and, therefore, the present invention is particularly applicable for use in light colored natural rubber. However, it is necessary that dark colored rubber molded with, or otherwise adjoining, the light colored rubber also must contain a non-staining antiozonant. Accordingly, the novel antiozonant of the present invention also is advantageously utilized in such dark colored rubber.

Natural rubber generally is regarded as comprising naturally occurring isoprene polymers. The natural rubbers include Hevea rubber, caoutchouc, balata, gutta percha, etc. Although natural rubber appears to have better tear resistance during normal service than synthetic rubber, the natural rubber does undergo ozone cracking and, in unusual service or long periods of service, does fail because of ozone cracking. Furthermore, the presence of cracks in rubber products also is objectionable for aesthetic reasons. Customers and users of rubber products object to the unsightly cracks in the rubber and, therefore, it is important that such cracks be avoided.

While the present invention is particularly applicable for use in light colored natural rubber and dark colored rubber associated therewith, it is understood that the present invention may be used for stabilization of other dark colored natural rubber. Similarly, the present invention may be utilized for preventing ozone cracking in synthetic rubber. Much of the synthetic rubber now being produced commercially is known in the art as SBR rubber and is a copolymer of butadiene and styrene. Other synthetic rubbers include those produced from butadiene and acrylonitrile (Buna-N, NBR), isoprene and isobutylene (butyl rubber, IIR), etc. Still other synthetic rubbers include Thiokol rubber, silicone rubber, neoprene rubber, etc.

In one embodiment the present invention relates to a novel method of preventing the cracking of rubber due to ozone, which comprises incorporating therein an antiozonative concentration of an antiozonant selected from the group consisting of (1) alkaneboronic and dialkylborinic acids, (2) aryl borates, and (3) alkyl borates containing 7 to 10 carbon atoms in said alkyl and being attached through an intermediate carbon atom to the oxygen.

In a specific embodiment the present invention relates to a method of preventing the cracking of light colored natural rubber due to ozone and also avoiding staining thereof, which comprises incorporating in said rubber from about 0.25% to about 5% by weight of tri(diisobutylcarbinyl) borate.

In another specific embodiment the present invention relates to a method of preventing the cracking of rubber due to ozone, which comprises incorporating in said rubber from about 0.25% to about 5% by weight of 2,6-di-tert-butyl-4-methylphenyl di-n-butyl borate.

As will be noted from the embodiments hereinbefore set forth, certain boric acid derivatives are utilized in accordance with the present invention as antiozonants in rubber. Surprisingly, the boric acid derivatives behave uniquely and peculiarly in their ability to function as antiozonants. It appears that the critical factors comprise both the number of carbon atoms in, and the particular configuration of, the group attached to the oxygen atom which, in turn, is attached to the boron atom. This criticality appears to be specific within each class of boric acid derivatives and will be described hereinafter in further detail in a discussion of the different classes of boric acid derivatives. Furthermore, this unique situation, in turn, necessitates the use of a Markush grouping to properly claim the generic aspects of the present invention.

As will be noted from the embodiment hereinbefore set forth, the first class of boric acid derivatives in the Markush grouping comprises alkylboric acids. These acids comprise those in which a carbon atom of the alkyl group or groups are bonded directly to the boron atom. The acids containing one alkyl groups are named as alkaneboronic acids. The acids containing two alkyl groups are named as dialkylborinic acids. In the interest of simplicity, these will hereinafter be referred to as the alkylboric acids. Surprisingly, in this class of boric acid derivatives, the alkylboric acids function as antiozonants, whereas phenylboric acid (benzeneboronic acid) is not effective for this purpose. As hereinbefore set forth, this is surprising because, as will be discussed hereinafter, the aryl borates are effective antiozonants and it would have been expected that phenylboric acid also would function as an antiozonant.

Any suitable alkylboric acid may be used in accordance with the present invention. Particularly preferred alkylboric acids comprise those containing from 8 to 14 carbon atoms in the alkyl group. Illustrative boric acids in this group include octylboric acid, nonylboric acid, decylboric acid, undecylboric acid, dodecylboric acid, tridecylboric acid, tetradecylboric acid, etc. While the monoalkylboric acids are preferred, the corresponding dialkylboric acids may be used. Illustrative compounds include dioctylboric acid, dinonylboric acid, didecylboric acid, diundecylboric acid, didodecylboric acid, ditridecylboric acid, ditetradecylboric acid, etc. In this embodiment of the invention, the alkyl group or groups may be of primary, secondary or tertiary configuration. In the primary alkyl configuration, the alkyl group is attached through a terminal carbon atom to the boron atom. In the secondary alkyl configuration the alkyl group is attached through an intermediate carbon atom to the boron atom and the carbon atom attached to the boron atom is in turn attached to 2 other carbon atoms. In the tertiary alkyl configuration the carbon atom attached to the boron atom is itself attached to 3 other carbon atoms.

The second class of the Markush grouping are aryl borates. The borates are boric acid esters and comprise those in which the carbon atom is attached to an oxygen atom which, in turn, is attached to the boron atom. Any suitable aryl borate may be used in accordance with the present invention. The triaryl borates are preferred. Illustrative examples are triphenyl borate, tritolyl borate also named tricresyl borate, tri-(dialkylphenyl) borates including trixylyl borate, tri-(dipropylphenyl) borate, tri-(dibutylphenyl) borate, tri-(diamylphenyl) borate, tri-(dihexylphenyl) borate, etc., tri-(trialkylphenyl) borates including tri-(trimethylphenyl) borate, tri-(triethylphenyl) borate, tri-(tripropylphenyl) borate, tri-(tributylphenyl) borate, tri-(triamylphenyl) borate, tri-(trihexylphenyl) borate, etc., and tri-(dialkylphenyl) borates and tri-(trialkylphenyl) borates in which the alkyl groups differ from each other but preferably are selected from those specifically set forth above. Illustrative examples of preferred tri-(dialkylphenyl) borates and tri-(trialkylphenyl) borates include tri-(2,6-diisopropylphenyl) borate, tri-(2,6-di-sec-butylphenyl) borate, tri-(2,6-di-tert-butylphenyl) borate, tri-(2,6-di-sec-amylphenyl) borate, tri-(2,6-di-tert-amylphenyl) borate, etc., tri-(2,6-diisopropyl-4-methylphenyl) borate, tri-(2,6-di-sec-butyl-4-methylphenyl) borate, tri-(2,6-di-tert-butyl-4-methylphenyl) borate, etc. It is understood that the mono- and diaryl borates may be used in accordance with the present invention and preferably the aryl component or components are selected from those specifically set forth above. In some cases the dialkylphenyl and trialkylphenyl borates may comprise a mixture of compounds as, for example, the cresyl borates may comprise a mixture of 2 or 3 of the ortho-, meta- and para-cresyl borates.

In another embodiment the aryl borates include mixed aryl and alkyl borates and may comprise the di- or tri-substituted borates. Illustrative examples of these include aryl alkyl borates, diaryl alkyl borates and aryl dialkyl borates, in which the aryl and alkyl groups preferably are selected from those specifically set forth above. Illustrative examples of borates in this class include 2,6-di-tert-butyl-4-methylphenyl di-n-butyl borate, 2,6-di-tert-butylphenyl di-n-butyl borate, 2,6-diisopropyl-4-ethylphenyl di-n-butyl borate, 2,6-diisopropylphenyl di-n-butyl borate, 2,6-di-tert-amyl-4-methylphenyl di-n-butyl borate, etc., as well as those in which the alkyl groups are selected from ethyl, propyl, amyl, hexyl, heptyl, octyl, etc. Illustrative examples of diaryl alkyl borates include diphenyl hexyl borate, dicresyl amyl borate, dixylyl butyl borate, di-(2,6-di-tert-butylphenyl) n-butyl borate, di-(2,6-diisopropyl-4-methylphenyl) n-propyl borate, etc. Examples of aryl alkyl borates include phenyl amyl borate, cresyl butyl borate, xylyl propyl borate, etc. In some cases, the corresponding aryl alkyl borates may be used. Illustrative examples include tribenzyl borate, triphenylethyl borate, triphenylpropyl borate, triphenylbutyl borate, etc., dibenzyl ethyl borate, dibenzyl propyl borate, dibenzyl butyl borate, dibenzyl amyl borate, etc., benzyl diethyl borate, benzyl dipropyl borate, benzyl dibutyl borate, benzyl diamyl borate, etc., benzyl ethyl borate, benzyl propyl borate, benzyl butyl borate, benzyl amyl borate, etc.

The third class of the Markush grouping hereinbefore set forth comprises alkyl borates containing 7 to 10 carbon atoms in said alkyl and attached through an intermediate carbon atom to the oxygen which, in turn, is attached to the boron atom. The unique characteristics of the boric acid derivatives are particularly evidenced in this class. Accordingly, it is necessary that the alkyl borate contains 7 to 10 carbon atoms in the alkyl group and also must be secondary configuration; that is, the alkyl group is attached through an intermediate carbon atom to the oxygen. As will be shown in the appended examples, trialkyl borates containing 8 carbon atoms, for example, attached through a terminal carbon atom to the oxygen (primary configuration), are not effective antiozonants. On the other hand, a trialkyl borate in which the alkyl groups contain 12 carbon atoms each, even though of secondary configuration, was not effective for this purpose. Thus, the importance of both the number of carbon atoms in the alkyl group and the particular configuration thereof is evident. A preferred alkyl borate in the above class is tri-(diisobutylcarbinyl) borate. Other trialkyl borates include tri-(diisopropylcarbinyl) borate, tri-(di-n-butylcarbinyl) borate, etc. It is understood that the corresponding monoalkyl borates and dialkyl borates may be used in accordance with the present invention.

From the hereinbefore description, it will be seen that, although a large number of boric acid derivatives may be used in accordance with the present invention, it is essential that these derivatives meet the specific requirements set forth herein. Also, it is understood that the different boric acid derivatives are not necessarily equivalent for use in the same or different rubber compositions.

The concentration of boric acid derivative, hereinafter referred to as antiozonant, will be selected to give the desired protection against ozone cracking. The antiozonant may be used in a concentration of from about 0.25% to about 5% by weight of the rubber hydrocarbon, and preferably in a concentration of from about 2% to about 5% by weight thereof, although lower or higher concentrations may be used in some cases and thus may range from about 0.01% to about 10% by weight. These concentrations are based on the rubber hydrocarbon exclusive of the other components of the final rubber composition and are used in this manner in the present specifications and claims.

The antiozonant of the present invention is used in any rubber composition subject to ozone cracking, including those used for rubber tires and tubes, hose, belts, sheet and thread rubber, rubberized fabrics, molded goods, boots and shoes, etc., whether vulcanized in a mold, in open steam, in hot air or in the cold by the so-called acid process. Furthermore, it is understood that the antiozonant of the present invention can be used in reclaims and latices of rubbery materials, whether or not admixed with fillers, pigments, accelerating agents, etc. In another embodiment the present invention can be utilized for the stabilization of adhesives, elastomers, etc. which tend to crack due to ozone.

It is understood that the antiozonant of the present invention is utilizable along with other addtives incorporated in rubber for specific purposes including, for example, accelerator, softener, extender, reinforcing agent, antioxidant, wax, etc.

The antiozonant of the present invention is incorporated in rubber or rubbery products in any suitable manner and at any suitable stage of preparation. When the antiozonant is added to a liquid, such as rubber pigment or an oil, it is dissolved therein in the desired proportions. When it is to be added to a solid substrate, it is incorporated therein by milling, mastication, etc., or it may be applied externally by brushing, spraying, etc., or by dipping, suspending, immersing, etc. the vulcanized rubber into a solution or dispersion of the antiozonant. When the antiozonant is a solid or is a liquid composited with a solid carrier, it may be utilized as such or as a solution or dispersion, or as a powder, paste, etc.

The following examples are introduced to illustrate further the novelty and utility of the present invention but not with the intention of unduly limiting the same.

EXAMPLE I

The data reported in this example were obtained with white rubber of the following recipe.

*Table I*

| Components: | Parts by weight |
|---|---|
| Pale crepe | 100 |
| Zinc oxide | 5 |
| Stearic acid | 3 |
| Sulfur | 3 |
| Benzothiazyl disulfide | 1 |
| Antiozonant, when used | 2 |

The rubber was cured at 284° F. for 40 minutes, milled in a conventional manner and then cut into strips which were evaluated in a dynamic test. In this test the strips of rubber were subjected to 320 flexes per minute of from 0 to 20% elongation in an ozone cabinet at a temperature of 74° F. in the presence of 30 parts of ozone per 100 million parts of air. The time to first cracks was determined.

The following table reports the results of evaluations of different samples of the rubber. Sample No. 1 contained no antiozonant and is the control or blank sample. Sample No. 2 contained 2% by weight of tricresyl borate. The tricresyl borate used in this sample was a mixture of the meta and para cresyl borates. Sample No. 3 contained 2% by weight of 2,6-di-tert-butyl-4-methyl di-n-butyl borate. Sample No. 4 contained 2% by weight of tri-(diisobutylcarbinyl) borate.

*Table II*

| Sample No. | Antiozonant | Hours to First Crack |
|---|---|---|
| 1 | None | 2. |
| 2 | Tricresyl borate | No cracks in 24 hours. |
| 3 | 2,6-di-tert-butyl-4-methyl phenyl di-n-butyl borate. | Do. |
| 4 | Tri-(diisobutylcarbinyl) borate | Do. |

From the data in the above example, it will be noted that 3 different antiozonants of the present invention served to retard cracking of the rubber from 2 hours (sample No. 1) to greater than 24 hours. It will be noted that samples 2 and 3 are examples of antiozonants in the second class and that sample No. 4 is an example of an antiozonant in the third class of the Markush grouping hereinbefore set forth.

EXAMPLE II

This example illustrates two samples of antiozonants in the first class of the Markush grouping hereinbefore set forth. These antiozonants were evaluated in substantially the same manner as described in Example I, except that the ozone was present in a concentration of 35 parts of ozone per 100 million parts of air.

The first antiozonant of this example is nonylboric acid and was incorporated in the rubber in a concentration of 2% by weight. When evaluated in the ozone cabinet in the manner described in Example I, the sample of rubber containing nonylboric acid underwent no cracking within about 8 hours. In contrast, the sample of rubber not containing an antiozonant underwent cracking within 2 hours.

The second antiozonant is dodecylboric acid. When evaluated in another sample of the rubber and in the same manner as described in Example I, but in the presence of 35 parts of ozone per 100 million parts of air, the sample of rubber containing dodecylboric acid underwent no cracking within about 4 hours. This is in contrast to the control sample of the rubber (not containing an antiozonant) undergoing cracking within 2 hours.

EXAMPLE III

Sample No. 4 in Table II of Example I is tri-(diisobutylcarbinyl) borate and was effective in preventing cracking of the rubber. This antiozonant is an example in the third class of the Markush grouping hereinbefore set forth. It will be noted that this is an alkyl borate containing 7 to 10 carbon atoms in the alkyl group and attached through an intermediate carbon atom to the oxygen. These requirements are essential as will be shown by a comparison of compounds evaluated in the same manner as described in Example I which compounds, although somewhat related to sample No. 4, either did not contain an alkyl group of 7 to 12 carbon atoms or the alkyl group is attached through a terminal and not an intermediate carbon atom to the oxygen.

The following compounds, when evaluated as described above, did not retard cracking of the rubber beyond that observed in the control sample (not containing an antiozonant): (1) tri-n-octyl borate—it will be noted that this compound contains 8 carbon atoms in the alkyl group but that the alkyl group is attached through a terminal carbon atom to the oxygen. This compound was ineffective as an antiozonant. (2) tri-(2-ethylhexyl) borate—here again is an example of a compound containing 8 carbon atoms in the alkyl group but attached through a terminal carbon atom to the oxygen. This compound also was ineffective for the purpose. (3) tri-(2,6,8-trimethyl-4-nonyl) borate—this compound contains alkyl groups attached through an intermediate carbon atom to the oxygen, but the alkyl group contains 12 carbon atoms. As mentioned above, this compound was ineffective as an antiozonant. (4) The following trialkyl borates all contain less than 7 carbon atoms in the alkyl group and all were ineffective in retarding cracking of the rubber: (a) triethyl borate, (b) triisopropyl borate, (c) triallyl borate, (d) tri-n-butyl borate, and (e) triisobutyl borate. (5) The importance of the alkyl substitution is also illustrated by the fact that boric acid was not effective for the purpose.

From the examples given above, it will be noted that the specific requirements of the boric acid derivatives as set forth in the Markush grouping is essential in order that the compound will serve to retard cracking of the rubber due to ozone.

I claim as my invention:

1. Natural rubber normally subject to cracking by the action of ozone containing an antiozonative concentration of an antiozonant compound consisting of carbon, hydrogen, oxygen and boron and selected from the group consisting of (1) alkaneboronic and dialkylborinic acids, (2) aryl borates and (3) alkyl borates containing from 7 to 10 carbon atoms in an alkyl group and said alkyl group being attached through an intermediate carbon atom to an oxygen of the alkyl borate.

2. Natural rubber normally subject to cracking by the action of ozone containing from about 0.25% to about 5% by weight of tricresyl borate.

3. Natural rubber normally subject to cracking by the action of ozone containing from about 0.25% to about 5% by weight of 2,6-di-tert-butyl-4-methyl phenyl di-n-butyl borate.

4. Natural rubber normally subject to cracking by the action of ozone containing from about 0.25% to about 5% by weight of tri-(diisobutylcarbinyl) borate.

5. Natural rubber normally subject to cracking by the action of ozone containing from about 0.25% to about 5% by weight of nonylboric acid.

6. Natural rubber containing an antiozonative concentration of an alkaneboronic acid.

7. Natural rubber containing an antiozonative concentration of an aryl borate.

8. Natural rubber containing an antiozonative concentration of an alkyl borate having an alkyl group of from 7 to 10 carbon atoms and said alkyl group being attached through an intermediate carbon atom to an oxygen atom of the borate.

9. Natural rubber containing an antiozonative concentration of a dialkylborinic acid.

References Cited by the Examiner
UNITED STATES PATENTS

| | | | |
|---|---|---|---|
| 2,418,358 | 4/47 | Lincoln et al. | 252—400 |
| 2,493,390 | 1/50 | Chaban | 260—45.7 |
| 2,526,506 | 10/50 | Rogers et al. | 252—400 |
| 2,617,783 | 11/52 | Slocombe et al. | 260—45.7 |
| 2,813,830 | 11/57 | Trautman | 252—400 |
| 3,067,147 | 12/62 | Dombrow et al. | 260—45.7 |
| 3,082,192 | 3/63 | Kirshenbaum et al. | 260—45.7 |

WILLIAM H. SHORT, *Primary Examiner.*

D. ARNOLD, LEON J. BERCOVITZ, *Examiners.*